United States Patent
Stauder et al.

(10) Patent No.: US 7,982,928 B2
(45) Date of Patent: Jul. 19, 2011

(54) METHOD, SYSTEM AND DEVICE FOR COLOUR QUALITY CONTROL

(75) Inventors: Jürgen Stauder, Montreuil sur Ille (FR); Laurent Blondé, Thorigne Fouillard (FR); Philippe Robert, Thorigne Fouillard (FR)

(73) Assignee: Thomson Licensing, Boulogne-Billancourt (FR)

( * ) Notice: Subject to any disclaimer, the term of this patent is extended or adjusted under 35 U.S.C. 154(b) by 532 days.

(21) Appl. No.: 12/083,294

(22) PCT Filed: Oct. 12, 2006

(86) PCT No.: PCT/EP2006/067355
§ 371 (c)(1),
(2), (4) Date: Apr. 9, 2008

(87) PCT Pub. No.: WO2007/045602
PCT Pub. Date: Apr. 26, 2007

(65) Prior Publication Data
US 2009/0251746 A1    Oct. 8, 2009

(30) Foreign Application Priority Data
Oct. 19, 2005    (EP) .................................... 05109715

(51) Int. Cl.
*G06K 9/48*    (2006.01)
*H04N 1/409*    (2006.01)

(52) U.S. Cl. ...... 358/518; 358/3.26; 358/3.27; 382/165; 382/167; 382/260; 382/266

(58) Field of Classification Search .................. 358/1.9, 358/2.1, 3.27, 448, 518, 527; 382/162, 164, 382/165, 167, 190, 254, 260, 264, 265, 266; 345/589
See application file for complete search history.

(56) References Cited

U.S. PATENT DOCUMENTS

| | | | |
|---|---|---|---|
| 4,812,903 A | 3/1989 | Wagensonner et al. | |
| 7,064,866 B1 * | 6/2006 | Asada | 358/2.1 |
| 7,747,100 B2 * | 6/2010 | Kim et al. | 382/264 |
| 2002/0159623 A1 | 10/2002 | Shinbatta | |
| 2003/0016855 A1 | 1/2003 | Shinbata | |
| 2003/0035581 A1 * | 2/2003 | Islam | 382/199 |
| 2004/0252907 A1 * | 12/2004 | Ito | 382/260 |
| 2006/0269159 A1 * | 11/2006 | Kim et al. | 382/256 |
| 2007/0286515 A1 * | 12/2007 | Kim et al. | 382/254 |
| 2010/0040283 A1 * | 2/2010 | Tsukioka | 382/167 |
| 2010/0135575 A1 * | 6/2010 | Guo et al. | 382/164 |
| 2010/0231759 A1 * | 9/2010 | Tsutsumi et al. | 348/242 |

OTHER PUBLICATIONS

Search Report Dated Jan. 18, 2007.

* cited by examiner

*Primary Examiner* — Kimberly A Williams
(74) *Attorney, Agent, or Firm* — Robert D. Shedd; Jeffrey M. Navon

(57) ABSTRACT

A colour quality control device adapted for use in a system for colour correction of an image to be reproduced on at least one reproduction device that is calibrated by a reproduction forward transform. The system also comprises a colour correction device adapted to correct at least one colour in the image. The colour quality control device comprises a false contour detection unit that uses information from the reproduction forward transform to decide if a contour in the image is a false contour introduced by the transform. This facilitates the operator's work during colour correction. A system and a method are also provided.

7 Claims, 3 Drawing Sheets

METHOD, SYSTEM AND DEVICE FOR COLOUR QUALITY CONTROL

This application claims the benefit, under 35 U.S.C. §365 of International Application PCT/EP2006/067355, filed Oct. 12, 2006, which was published in accordance with PCT Article 21(2) on Apr. 26, 2007 in English and which claims the benefit of European patent application No. 05109715.2, filed Oct. 19, 2005.

FIELD OF THE INVENTION

The invention relates generally to colour management, and more particularly to out-of-gamut detection and warnings in systems for managing colour.

BACKGROUND OF THE INVENTION

In the age of introduction of digital film processing and digital cinema, multiple digital processing steps appear in the—classically analogue—cinematographic workflow. While digital special effect generation and post-production have been common for some time, digital cameras and new digital display devices and digital media now begin to be widespread. The digital equipment completely changes working habits during capture and post-processing and while digital technologies bring new features, they also represent a danger for artistic experience and heritage. It is thus necessary to transfer known artistic effects from conventional—analogue—cinematographic post-processing into digital cinema post-processing. Since the introduction of new equipment is expected to be gradual, technologies for co-existing analogue and digital processes have to be studied. This may for example concern a film captured by an analogue film camera and then displayed by a digital projector, or integration of digital special effects in an analogue film production chain.

One of the artistic workflow tools is colour correction, which for example is applied to raw film material after production to compensate for illumination colour artefacts or, before film distribution, to fine-tune the colour tones in order to realize artistic intents for certain scenes. Apart from being an important step of cinematographic post-processing, colour correction is also applied to photographs, paintings or graphics before printing.

Colour correction can be applied to a sequence of video frames, to a single video frame, to still images or even to parts of an image, such as an object therein. It is usually performed in cooperation between an artistic director and one or more skilled operators. The artistic director describes the intent of the colour correction while the operator transforms the intent into a colour transform applied to the visual content. Such colour transforms may for example include an increase of saturation, a change of colour hue, a decrease of red tones or an increase of contrast. Colour correction may be global to an image, to a set of images, to a specific region in one single image or even to all image regions in several images corresponding to a specific semantic unit.

During colour correction, the artistic director and the operator have to keep in mind what the impact of the applied colour correction will be on the final reproduction medium. The following examples illustrate this problem. In a first example, a painting is scanned and colour corrected using a personal computer (PC). The operator verifies the applied colour correction on the display of the PC, but the final reproduction is done on paper printer. A second example is a film that is scanned, digitalized, and colour corrected using a dedicated high-resolution colour correction device. The operator verifies the applied colour correction on the screen of a high definition control monitor, but the final reproduction is done by a film printer followed by film projection.

In both of these examples, the verified colour may be different from the reproduced colour, any differences between the proof viewing display device (for example the PC monitor screen or the high definition control monitor) and the final reproduction device (for example a paper printer or a film printer followed by film projection) should be taken into account during colour correction. These differences can include changes of hue, changes of saturation, changes of contrast, changes of luminance, changes of dynamic range, changes of colour gamut.

A known, partial solution to this problem is colour management (CMM). For CMM, the characteristics of the proof viewing device and the final reproduction device are measured, mathematically modelled, and then compensated for, using a colour transformation. CMM takes into account the colour gamut, which describes the totality of reproducible colours of a display device, of the devices involved. When an image contains colours outside of the gamut of a display device or close to the border of the gamut, the applied colour transform may contain colour compression, colour clipping or other specific operations such that the transformed colours are inside of the gamut.

It is easily realised that the difference between colour gamuts of display devices causes a problem for colour correction. It may happen that the operator applies a colour correction that generates an acceptable result on the proof-viewing device while the final reproduction device is not capable of reproducing some of the colours, since the colour gamut of the final reproduction device is different from that of the proof-viewing device. It may also happen that the operator wants to apply a specific colour correction which would generate acceptable results on the final reproduction device, while the correction cannot be sufficiently visualized on a proof-viewing device with limited colour gamut.

A second problem of colour correction is caused by the colour transformations of CMM. These colour transforms transform input colour values to output colour values. The transforms may comprise several partial colour transforms, each defined for a specific range of valid input colours. On the borders between such ranges of valid input colour, the colour transform may change its slope or be discontinuous. This may generate false contours in the transformed image. What's more, colour transforms often use Look-Up Tables (LUTs) that contain a set of pairs of sample input and sample output colours. When colour is transformed in a LUT, colours in-between the sample colours must be interpolated. Colour interpolation may introduce discontinuous colours or discontinuous slopes of colours at sample colours, which may generate false contours in the transformed image.

It is well-known in the art to detect colour values outside a colour gamut of a reproduction device, so-called "out of gamma alarm." For example, US patent application US 2003/0016230 A1 teaches a system that indicates all colours from a colour palette that are outside the gamut of a reproduction device.

The present invention intends to improve upon the prior art by providing a way for an operator to be informed of possible problems in a reproduced image caused by colour correction.

SUMMARY OF THE INVENTION

In a first aspect, the invention is directed to a colour quality control device adapted for use in a system for colour correction of an image to be reproduced on at least one reproduction device that is calibrated by a reproduction forward transform. The transformed colours are called transformed reproduction colours. The system further comprises a colour correction device adapted to correct colours in the image. The output colours of the correction device are called corrected colours. The colour quality control device comprises a false contour detection unit adapted to use information from the reproduction forward transform to decide if a contour in the image is a false contour.

In a preferred embodiment, the false contour detection unit is adapted to find contours in the image and use information about anomalies in the reproduction forward transform to decide if a found contour is a false contour.

In an alternative preferred embodiment, the false contour detection unit is adapted to use information about anomalies in the reproduction forward transform to search in the image for contours between corrected colours around such anomalies and decide that any contour found in the image is a false contour.

In another preferred embodiment, the false contour detection unit is adapted to search for contours in the image of transformed reproduction colours, search for contours in the image of corrected colours, and classify a detected contour in the image of transformed reproduction colours as a false contour if there is no corresponding contour in the image of corrected colours.

In a further preferred embodiment, the reproduction forward transform is given by a piecewise defined function.

In yet another preferred embodiment, the colour quality control device further comprises a visualisation unit adapted to provide information about false contours to a user.

In a second aspect, the invention is directed to a system for colour correction of images. The system comprises a colour correction device adapted to correct colours in an image, a proof viewing device adapted to display the corrected image to a user, and a colour quality control unit according to the first aspect of the invention.

In a third aspect, the invention is directed to a method for controlling colour quality in a colour correction system. At least one colour in an image to be reproduced on at least one reproduction device that is calibrated by a reproduction forward transform is corrected by a colour correction device. A colour quality control unit uses information from the reproduction forward transform to decide if a contour in the image is a false contour.

BRIEF DESCRIPTION OF THE DRAWINGS

Preferred features of the present invention will now be described, by way of example, with reference to the accompanying drawings, in which.

DETAILED DESCRIPTION OF PREFERRED EMBODIMENTS

In the following exemplary, non-limitative embodiment, the invention is described for the case of colour correction of a digitalized film using a dedicated colour correction device and final reproduction by film printing followed by film projection.

Figure 1:
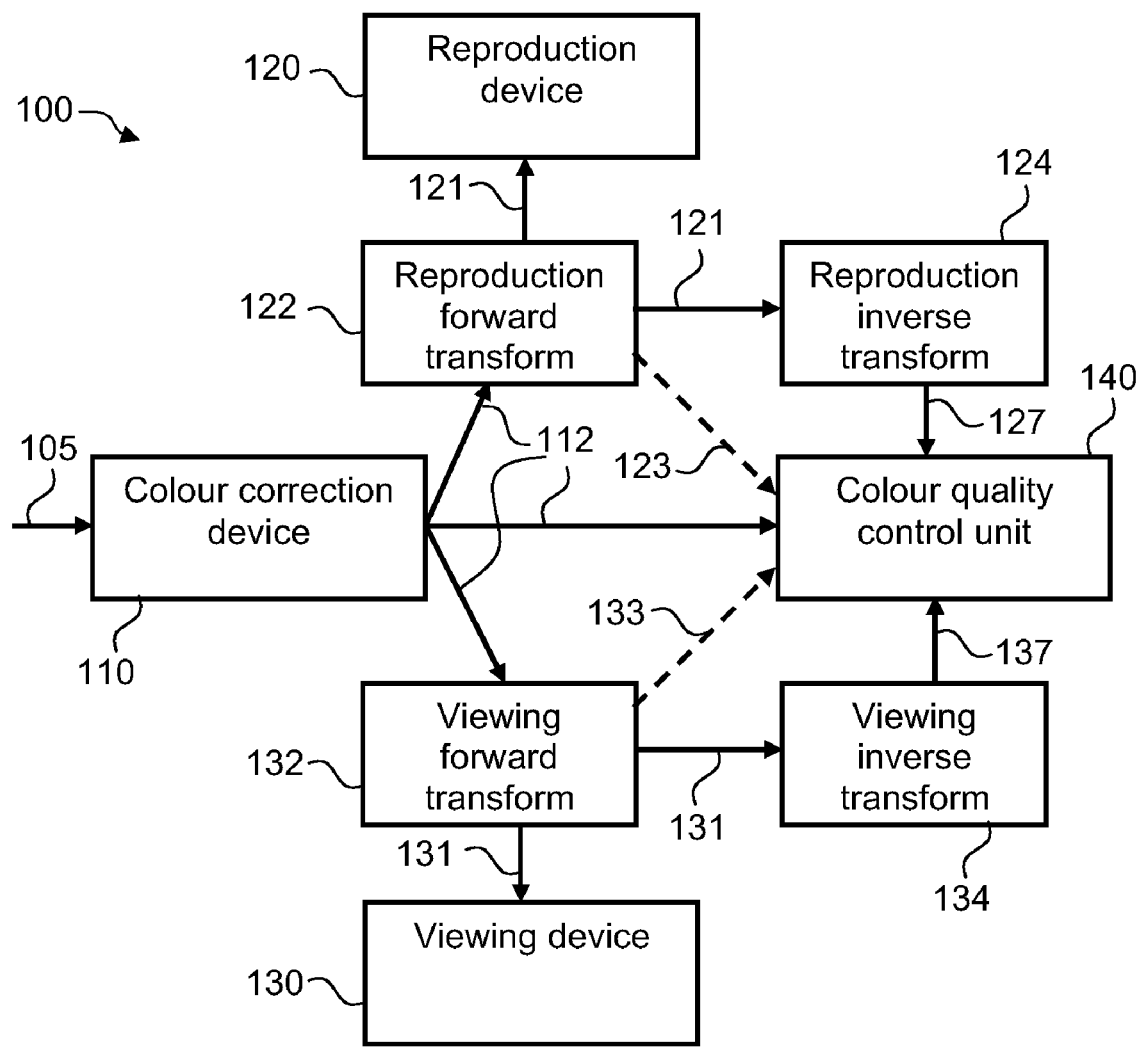
FIG. 1 illustrates a colour correction environment in which the method according to the invention is used.

FIG. 1 illustrates a colour correction environment 100 using colour management (CMM) for use with the invention.

A colour correction device 110 receives as input 105 a film that was digitalized by a film scanner (not shown). The operator applies colour corrections to the film, using the proof-viewing device 130 for feedback, while the film is finally reproduced using a final reproduction device 120, for example a film printer. While the exemplary embodiment comprises two devices (proof viewing device and reproduction device), the procedure can be extended to more than two devices.

The proof-viewing device 130 is calibrated using a proof viewing forward transform 132 that compensates for any device characteristics, so the corrected colours 112 received from the colour correction device 110 are shown as correctly as possible. The proof viewing forward transform 132 may include several partial colour transforms, LUT-based interpolation techniques and gamut clipping or gamut compression. It will be appreciated that corrected colours and the like should, in fact, be read as information about corrected colours.

The final reproduction device 120 is calibrated using a reproduction forward transform 122 that compensates for any device characteristics, so the corrected colours 112 received from the colour correction device 110 are reproduced as correctly as possible. The reproduction forward transform 122 may include several partial colour transforms, LUT-based interpolation techniques and gamut clipping or gamut compression.

A colour quality control unit 140 continuously analyses the colours. To this end, the colours 112 corrected by colour correction, information 123, 133 on the forward transforms 122, 132, and the colours 127, 137 transformed by inverse transforms 124, 134 of the reproduction device 120 and the proof-viewing device 130—called transformed colours—are input to the colour quality control unit 140. An inverse transform 124, 134 is usually intended to give the colours that are really displayed on a display 120, 130; and these colours may differ from the original colours 112.

Figure 2:
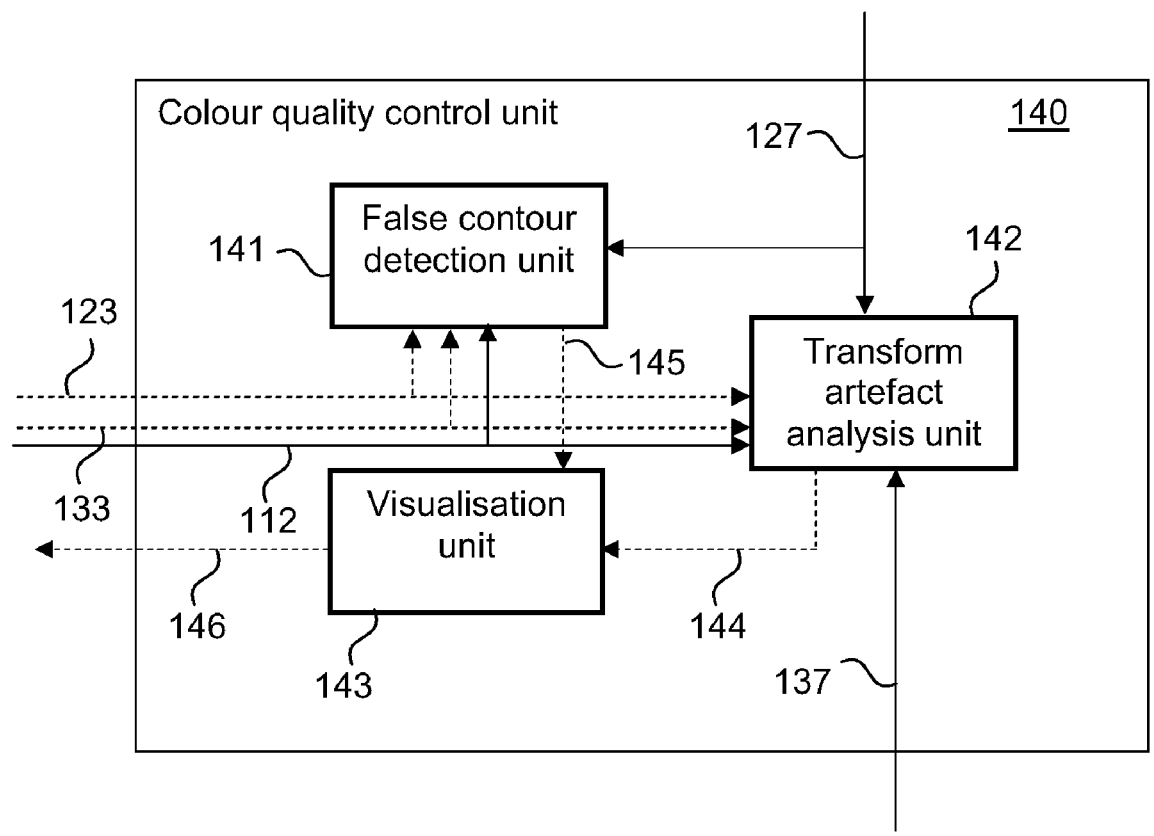
FIG. 2 illustrates a colour quality control unit according to the invention.

FIG. 2 illustrates a colour quality control unit according to the invention. The colour quality control unit comprises three general units:

a false contour detection unit 141, for detecting false contours in the transformed reproduction colours 127 using corrected colours 112, information 123, 133 on the forward transforms 122, 132, transformed reproduction colours 127 and transformed proof viewing colours 137;

a transform artefact analysis unit 142, for detecting transform artefacts using corrected colours 112, transformed reproduction colours 127; transformed proof viewing colours 137, and transform information 123, 133;

a visualisation unit 143, for producing an output 146 that alerts the operator of the existence of false contours and transform artefacts, based on false contour information 145 and transform artefact information 144.

False Contour Detection

False contours, i.e. luminance or colour discontinuities in flat image regions, are quite visible to the human eye. These unwanted false contours may appear during colour correction as is illustrated in FIG. 3.

Figure 3:
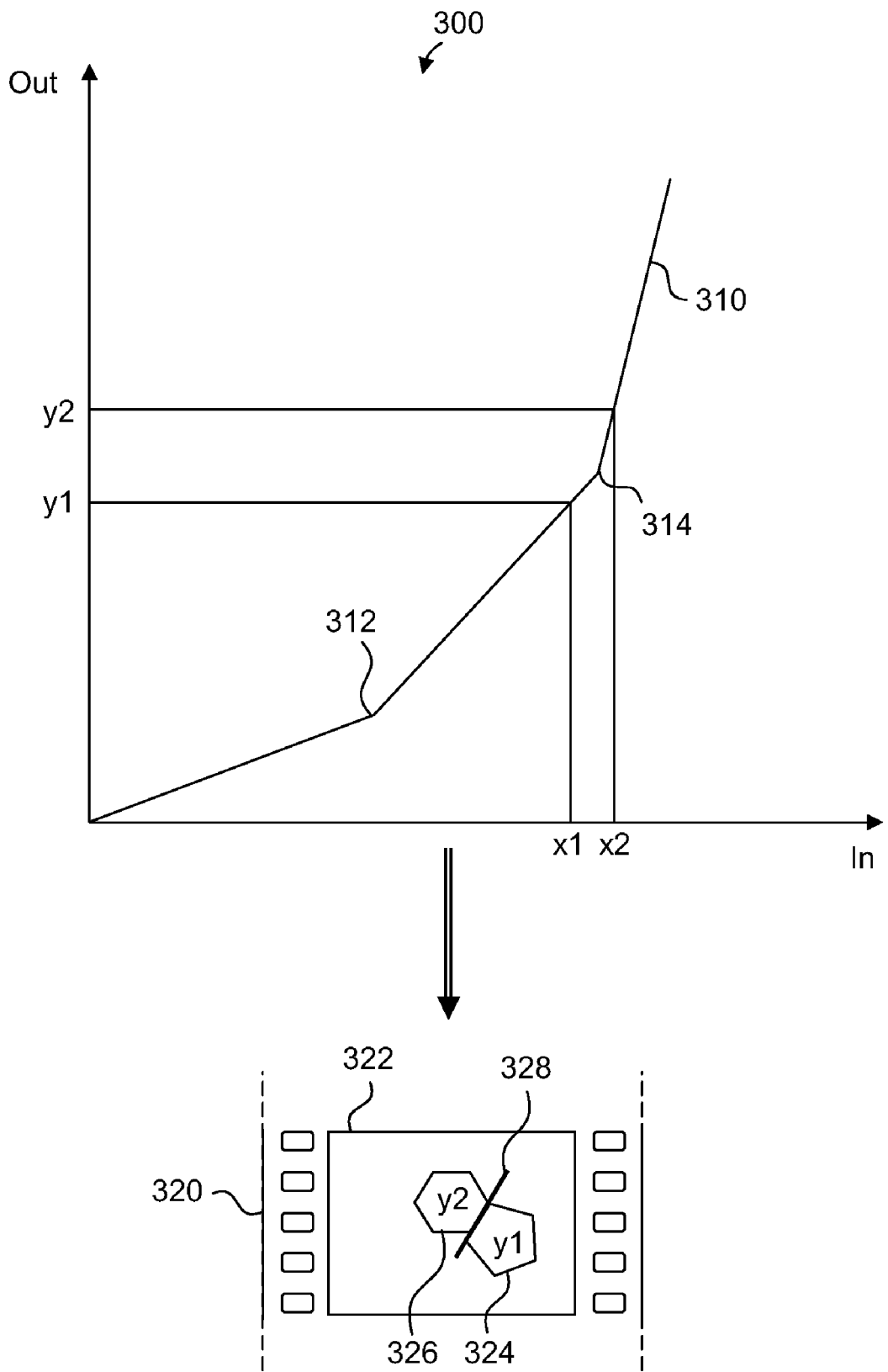
FIG. 3 is an exemplary illustration of the origin of false contours in an image.

FIG. 3 shows an exemplary transformation graph 300 in which e.g. colour values to be transformed, x1 and x2, are transformed by the colour transform function 310 into corrected colour values, y1 and y2. As long as the transform function is smooth (continuous in first and second order derivatives), false contours will normally not be produced by the transform, but false contours may appear as soon as it is not smooth, even though the transform is piecewise smooth (i.e. parts of the transform are smooth). In FIG. 3, the lack of smoothness is illustrated by two "knees" 312, 314.

Further illustrated in FIG. 3 is part of an analogue film 320 of which only one frame 322 is shown. In this frame 322 there are two areas 324, 326 that after colour correction have colour values y1 and y2, respectively. As the two colour values are close to each other, but on different sides of a knee 314, this may produce a false contour 328 (prolonged to be easily seen in the Figure). It should be noted that the exact meaning of "close" may differ from one part of the transform to another, but that a person skilled in the art is able to decide in each particular case, depending on how strict an interpretation he desires.

The false contour 328 was not part of the original image before colour correction, so the false contour 328 is most likely an unwanted phenomenon.

It should be noted that false contours also may appear when using other transformation techniques, such as using look-up tables (LUTs). In brief, false contours may appear when the corrected colours appear around anomalies in the transform or entry values of the LUT.

To analyse false contours, it is proposed to analyse a corrected image to detect contours and then to see if the corrected colours are on either side of an anomaly, in the present example a knee. Naturally, it is also possible to use the knowledge of the transform function to limit the search in the image to colours close to a knee, especially if there are a lot of such colours. Another possibility is to search for contours in the image of transformed reproduction colours and in the image of corrected colours, and to classify a contour in the former image as a false contour if there is no corresponding contour in the latter image.

A preferred embodiment of the analysis of false contours will now be explained in greater detail.

First, flat image regions are detected by the following steps:
1. For all image pixels, a criterion $K_F = \|\nabla C\|$ is calculated with $\nabla$ the derivation operator, $\|\bullet\|$ a norm operator and C a vector of colours for a set of neighboured image pixel, for example RGB values (Red Green Blue). Alternatively, other activity criteria may be employed.
2. Image pixels are declared flat when $K_F < T_F$, where $T_F$ is a threshold.
3. Flat image regions are detected from flat pixels by applying a median filter, morphologic opening and closing operations as well as a suppression of small non-connected regions.

In flat image regions, false contours are detected by the following steps:
1. For all pixels of flat image regions, a criterion $$K_C = \text{MIN}_i(\|C - C_i\|)$$

is calculated with $C_i$ being colour values with possible colour discontinuities, i.e. around transform anomalies. These colour values can be taken from transform information being either LUT entries, colour values on borders between valid ranges of partial transforms, or other specific colours where the transform is expected to be inhomogeneous. Alternatively, other variance criteria may be employed.
2. Image pixels are declared candidates of false contours if $K_C > T_C$, where $T_C$ is a threshold.
3. By analysis of their spatial neighbourhood, candidates are then either validated and connected to build a false contour or, if they are isolated, eliminated.

Detected false contours may be assessed in a post-processing step by a colour appearance model to judge the visibility of a false contour depending on image content and viewing conditions.

Using transform information 123, 133 and transformed reproduction colours 127, the false contour detection unit 141 provides information 145 about the detected false contours to the visualisation unit 143 so that the operator may receive one or more of warnings.

Transform Artefact Analysis

Transform artefacts appear for instance when transform results in a value that is outside the gamut. Transform artefact analysis is performed using transform information 123, 133. For a given proof viewing device 130 with given proof viewing forward transform 132 and proof viewing inverse transform 134, let $G_V$ be the gamut and $C_{V,j}$ colour values on the border of $G_V$. For a given reproduction device 120 with given reproduction forward transform 122 and reproduction inverse transform 124, let $G_R$ be the gamut and $C_{R,j}$ colour values on the border of $G_R$.

The present invention improves upon the prior art in that it analyses transform artefacts based on at least two gamuts, the gamut $G_V$ of a proof viewing device and the gamut $G_R$ of a reproduction device. This analysis may for example be extended to more than one proof viewing device and more than one reproduction device.

The transform artefact control detects the following cases:
1. Colour values outside $G_V$: A corrected colour value C is declared outside of $G_V$ when C is not included in $G_V$. Information about $G_V$ is included in transform information 133. In an alternative embodiment, $G_V$ is calculated as convex hull from colours 131 (not shown in FIGS. 1 and 2).
2. Colour values modified by proof viewing transforms: By measuring the difference between a corrected colour C and its corresponding transformed colour, the colour is declared to be modified when the difference is beyond a threshold. The difference measure can be done in a specific colour space (for example CIEXYZ, or CIELab).
3. Colour values outside $G_R$: A corrected colour value C is declared outside of $G_R$ when C is not included in $G_R$. Information about $G_R$ is included in transform information 123. In an alternative embodiment, $G_R$ is calculated as convex hull from colours 121 (not shown in FIGS. 1 and 2).
4. Colour values modified by reproduction transforms: By measuring the difference between a corrected colour C and its corresponding transformed colour, the colour is declared to be modified when the difference is beyond a threshold. The difference measure can be done in a specific colour space (for example CIEXYZ, or CIELab).

The transform artefact analysis unit 142 provides information 144 about the detected artefacts to the visualisation unit 143 so that the operator may receive one or more of a number of warnings.

Warning A indicates to the operator that he applies a colour correction that will result in a correctly reproduced colour on the reproduction device while the colour displayed on the proof viewing display is modified due to a limited gamut of the proof viewing device. In other words, the operator is told that "what he sees is not what he gets," but he may still get what he wants. Warning A is given in case 1 and/or 2 above, provided that cases 3 and 4 are not present.

Warning B indicates to the operator that he applies a colour correction that will result in an incorrectly reproduced colour on the reproduction device, because of the limited gamut of this device. Additionally, the incorrectly reproduced colour is not shown correctly on the proof-viewing device. This means that the operator cannot assess and control the incorrect colours of the reproduction device. Warning B is given in case 1 and/or 2, if at least one of cases 3 and 4 is present.

Warning B is notably interesting in an alternative embodiment in which the viewing forward transform 132 is fed by transformed reproduction colours 127 instead of corrected colours 112. In this embodiment, the proof-viewing device 130 usually reproduces the colour that is correctly or incorrectly reproduced by the reproduction device 120. Warning B indicates that the incorrectly reproduced colour is not shown correctly on the proof-viewing device.

Warning C indicates to the operator that he applies a colour transform that will result in an incorrectly reproduced colour on the reproduction device, because of the limited gamut of this device. However, the colour is shown correctly on the proof-viewing device. This means that the operator can assess and control the incorrect colours of the reproduction device. Warning C is given in case 3 and/or 4, provided that cases 1 and 2 are not present.

Visualization

The visualization module 143 prepares the false contour and artefact information 146, preferably for display by the proof viewing device 130. This may be a separate image, a superimposed image or textual, statistical information. In case of image visualization, false contours may be indicated as lines, while artefact warning A, B, and C may be visualized as artificially coloured pixel. A single, predetermined colour may be used to indicate false contours and warnings A, B, and C, but it is preferred that each of these four indications is represented by a particular colour, distinct from the others. It is further preferred that these colours are modified depending on the surroundings so that they are clearly visible. In case of textual visualization, number and type of artefacts or false contours may be displayed.

It should be noted that the components of the colour quality control unit 140, may each be implemented in a processor, that one or more of the components may share a processor, and that the entire colour quality control unit 140 may be implemented in a processor. Furthermore, the components may have access to a dedicated memory (not shown), or a memory that may be shared with other components.

It should also be noted that the forward transforms 122, 132 and the inverse transforms 124, 134 for, respectively, the reproduction device 120 and the proof viewing device 130, may be performed in the colour correction device 110, in the devices 120, 130 themselves, or in intermediate transform devices (not shown).

It can thus be appreciated that the present invention improves upon the prior art by providing a device adapted to control colour quality in an image, in particular by detecting false contours therein.

It will be understood that the present invention has been described purely by way of example, and modifications of detail can be made without departing from the scope of the invention.

Each feature disclosed in the description and (where appropriate) the claims and drawings may be provided independently or in any appropriate combination. Features may, where appropriate be implemented in hardware, software, or a combination of the two. Connections may, where applicable, be implemented as wireless connections or wired, not necessarily direct or dedicated, connections.

Reference numerals appearing in the claims are by way of illustration only and shall have no limiting effect on the scope of the claims.

The invention claimed is:

1. A system for colour correction of images, comprising
   a colour correction device adapted to correct at least one original colour in an original image, then generating corrected colours in a color corrected image,
   at least one reproduction device that is adapted to reproduce the colour corrected image, and that is calibrated by a reproduction forward transform that compensates for any characteristics of this reproduction device,
   a proof viewing device adapted to display the colour corrected image to a user, that is calibrated by a proof viewing forward transform that compensates for any characteristics of this proof viewing device,
   and a colour quality control device comprising a false contour detection unit adapted to use corrected colours and information from the reproduction forward transform and from the proof viewing forward transform to decide if a contour in the colour corrected image is a false contour, and wherein the false contour detection unit is adapted to:
   search for contours in the image of transformed reproduction colours;
   search for contours in the colour corrected image with corrected colours; and
   classify a detected contour in the image of transformed reproduction colours as a false contour if there is no corresponding contour detected in the colour corrected image with corrected colours.

2. The system for colour correction of images as claimed in claim 1, wherein the false contour detection unit is further adapted to use information about anomalies in the reproduction forward transform to decide if a found contour is a false contour.

3. The system for colour correction of images as claimed in claim 1, wherein the false contour detection unit is further adapted to:
   search for contours in the image of transformed proof viewing colours;
   search for contours in the colour corrected image with corrected colours; and
   classify a detected contour in the image of transformed proof viewing colours as a false contour if there is no corresponding contour detected in the colour corrected image with corrected colours.

4. The system for colour correction of images as claimed in claim 1, further comprising a visualisation unit adapted to provide information about false contours to a user.

5. A method for controlling colour quality in a colour correction system, the method comprising the step of correcting by a colour correction device at least one colour in an original image to be reproduced on at least one reproduction device that is calibrated by a reproduction forward transform that compensates for any characteristics of this reproduction device, and to be reproduced on a proof viewing device that is calibrated by a proof viewing forward transform that compensates for any characteristics of this proof viewing device, wherein said method further comprises the step of:
   deciding, by a colour quality control unit, using information from corrected colours from the reproduction forward transform and from the proof viewing forward transform, if a contour in the colour corrected image is a false contour,
   searching for contours in the image of transformed reproduction colours;
   searching for contours in the colour corrected image with corrected colours; and classifying a detected contour in the image of transformed reproduction colours as a false contour if there is no corresponding contour detected in the colour corrected image with corrected colours use information about anomalies in the reproduction forward transform to search in the colour corrected image for contours between corrected colours around such anomalies; and decide that any contour found in the colour corrected image is a false contour.

6. A method for controlling colour quality in a colour correction system, the method comprising the step of correcting by a colour correction device at least one colour in an original image to be reproduced on at least one reproduction device that is calibrated by a reproduction forward transform that compensates for any characteristics of this reproduction device, wherein said method further comprises the step of:

deciding, by a colour quality control unit, using information from corrected colours and the reproduction forward transform, if a contour in the colour corrected image is a false contour, searching for contours in the image of transformed reproduction colours;

searching for contours in the colour corrected image with corrected colours; and classifying a detected contour in the image of transformed reproduction colours as a false contour if there is no corresponding contour detected in the colour corrected image with corrected colours, use information about anomalies in the reproduction forward transform to search in the colour corrected image for contours between corrected colours around such anomalies; and decide that any contour found in the colour corrected image is a false contour.

7. A system for colour correction of images, comprising:

a colour correction device adapted to correct at least one original colour in an original image, then generating corrected colours in a color corrected image, at least one reproduction device that is adapted to reproduce the colour corrected image, and that is calibrated by a reproduction forward transform that compensates for any characteristics of this reproduction device, and a colour quality control device, wherein the colour quality control device comprises a false contour detection unit adapted to use corrected colours and information from the reproduction forward transform to decide if a contour in the colour corrected image is a false contour, and wherein the false contour detection unit is adapted to:

search for contours in the image of transformed reproduction colours;

search for contours in the colour corrected image with corrected colours; and classify a detected contour in the image of transformed reproduction colours as a false contour if there is no corresponding contour detected in the colour corrected image with corrected colours use information about anomalies in the reproduction forward transform to search in the colour corrected image for contours between corrected colours around such anomalies; and decide that any contour found in the colour corrected image is a false contour.

\* \* \* \* \*